United States Patent [19]

Story et al.

[11] 3,880,882

[45] Apr. 29, 1975

[54] METHOD OF PRODUCING MIXED DICYCLOALKYLIDENE PEROXIDES

[76] Inventors: Paul Richard Story, 113 St. James Dr., Athens, Ga. 30604; Bunge Lee, 250 Hillside St., Athens, Ga. 30601; Peter Busch, Frobelstrasse 3, 4156 Willich 1, Germany

[22] Filed: June 25, 1973

[21] Appl. No.: 373,092

Related U.S. Application Data

[60] Division of Ser. No. 253,576, May 15, 1972, which is a continuation-in-part of Ser. No. 842,689, July 17, 1969, abandoned.

[52] U.S. Cl. ............ 260/340.7; 260/338; 260/343; 260/610 R; 260/666 P; 252/522
[51] Int. Cl. .................................... C07d 19/00
[58] Field of Search ......... 260/338, 340.7, 253, 576

[56] References Cited
UNITED STATES PATENTS
3,528,898  9/1970  Story .................... 204/158

FOREIGN PATENTS OR APPLICATIONS
1,407,154  6/1965  France

OTHER PUBLICATIONS

T. Ledaal, Acta Chem. Scand. 21 (1967), No. 6, pp. 1656–1657.

*Primary Examiner*—Norma S. Milestone
*Attorney, Agent, or Firm*—Dennis P. Clarke

[57] ABSTRACT

Mixed cyclic trimeric peroxides are prepared by reacting 1,1'-dihydroperoxy dicyclic peroxides with cyclic ketones in liquid organic carboxylic acid solvents in the presence of strong acid catalysts at low temperatures.

The mixed trimeric peroxides are converted to mixed dimeric peroxides by allowing an organic carboxylic acid solution thereof containing a strong acid catalyst to stand at about room temperature for a short period of time.

1 Claim, No Drawings

METHOD OF PRODUCING MIXED DICYCLOALKYLIDENE PEROXIDES

RELATED APPLICATIONS

This is a division of application Ser. No. 253,576 filed May 15, 1972, which in turn is a continuation-in-part of application Ser. No. 842,689, filed July 17, 1969 and now abandoned.

BACKGROUND OF THE INVENTION

Macrocyclic hydrocarbons and lactones are valuable compounds useful as odorants or intermediates for the preparation of odorants in the perfume industry. They may be prepared by decomposing the corresponding cyclic di- and trimeric peroxides as described in U.S. Pat. No. 3,528,898. Obviously, the odorant characteristic of the macrocyclic compound will depend in each instance upon the ring size and the nature and location of the substituents thereon.

Di- and trimeric peroxides decompose to form macrocyclic compounds according to the following reaction schemes:

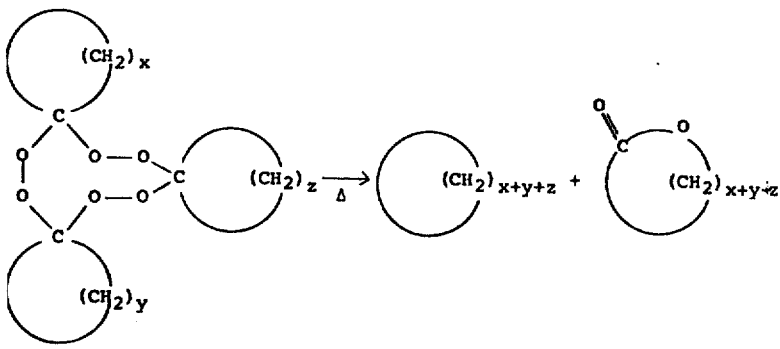

and

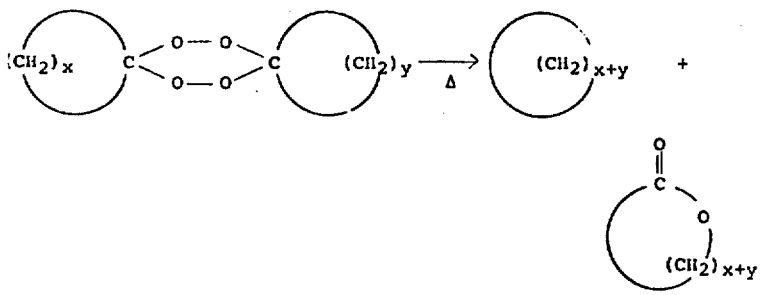

Obviously, the ring size of the macrocyclic compounds will depend upon the ring sizes of the starting peroxides. It will be readily apparent that where the di- and trimeric peroxides are symmetrical, i.e., $x=y=z$, their decomposition will yield macrocyclic compounds containing only $2x$ or $3x$ methylene ($CH_2$) groups, respectively. Thus, the decomposition of tricyclopentylidene peroxide will yield cyclododecane and cyclotridecanolide; the decomposition of tricyclohexylidene peroxide will yield cyclopentadecane and cyclohexadecanolide, etc. Likewise, the decomposition of diheptylidene peroxide will yield cyclododecane and cyclotridecanolide, etc.

It will also be apparent that it would be impossible to produce macrocyclic compounds having $2x \pm 1$ or $3x \pm 1$ methylene groups from symmetrical ($x=y=z$) di- and trimeric peroxides, respectively, since the decomposition of each succeeding member of the symmetrical di- and trimeric peroxide families will yield macrocyclic hydrocarbons and lactones differing from the proceding group of products by the addition to the ring of 2 or 3 carbon atoms, respectively.

For example, it would be impossible to produce cyclotridecane from a symmetrical trimeric peroxide since tricyclopentylidene peroxide yields cyclododecane and the next highest member of the series, tricyclohexylidene peroxide yields cyclopentadecane. Similarly, it would be impossible to produce cyclotridecane from a symmetrical dimeric peroxide since diheptylidene peroxide yields cyclododecane and the next highest member of the series, dioctylidene peroxide, yields cyclotetradecane.

It will also be apparent that it would be impossible to produce macrocyclic hydrocarbons and lactones containing a single substituent or plural different substituents from symmetrical di- and trimeric peroxides. Since in symmetrical peroxides each of the rings would contain the same substituent their decomposition would yield products containing 2 or 3 identical substituents, depending upon whether the starting material is a di- or trimeric peroxide.

The provision of non-symmetrical di- and trimeric peroxides, i.e., those of the above structure wherein one or more of $x$, $y$ and $z$ are different from each other, would enable the production of a wider variety of macrocyclic hydrocarbons and lactones having differing ring sizes and structures. Moreover, the provision of non-symmetrical peroxides containing only a single substituent or a wide variety of substituents would enable the production of substituted macrocyclic compounds heretofore unavailable in an efficient and economical manner.

Thus, a cyclotridecane could be produced by decomposing dipentylidene cyclohexylidene peroxide, a mixed trimeric peroxide. Similarly, cyclotridecane could be produced from heptylideneoctylidene peroxide. In addition, methoxycyclotridecane and methoxycyclotetradecanolide could be produced from dicyclopentylidene-4-methoxycyclohexylidene peroxide.

It should be readily apparent, therefore, that the provision of mixed trimeric and dimeric peroxides affords the perfume industry a less expensive and wider selection of macrocyclic hydrocarbons and lactones than theretofore available.

It is known that mixed organic trimeric peroxides may be prepared by reacting dihydroperoxy dicycloalkyl peroxides with liquid ketones. At pp. 54–56 of Vol. 8 of Houber-Weyl, Methoden der Organischen Chemie (1952) there is disclosed a method for preparing isopropylidene dicyclohexylidene peroxide by treating 1,-1'-dihydroperoxydicyclohexyl peroxide with an excess of acetone in the presence of anhydrous cupric sulfate for 14 days. The use of hydrochloric acid as a catalyst is also disclosed. This method is limited to the employment of liquid ketones, however. Heretofore, no method has been suggested which permits the use of solid ketones.

Additional prior art relating to the production of organic peroxides includes an article by T. Ledaal in Acta. Chem. Scand., Vol. 21, (1967) pp. 1656–57 wherein it is disclosed that symmetrical or non-mixed dimeric peroxides may be prepared by treating a carboxylic acid solvent solution of a ketone hydroperoxide with a strong acid. When employing cyclopentanone hydroperoxide a non-mixed trimeric peroxide was produced.

Dilthey et al., in Vol. 154 of Jour. Prakt. Chem. (1939–40) at pp. 219–237 disclose the oxidation of various ketones to produce non-mixed or symmetrical trimeric peroxides.

Heretofore, however, there has existed no efficient method for the production of relatively high yields of mixed or non-symmetrical di- or trimeric cyclic peroxides.

It is an object, therefore, of the present invention to provide an efficient method for the production of mixed or non-symmetrical tricyclic peroxides.

It is a further object of the present invention to provide a method for the preparation of mixed or non-symmetrical dicyclic peroxides by decomposition of the mixed trimeric peroxides.

It is a futher object of the present invention to provide novel mixed or non-symmetrical di- and tricyclic peroxides.

SUMMARY OF THE INVENTION

It has been found that mixed cyclic trimeric peroxides may be prepared in short reaction times and in high yields by reacting a 1,1'-dihydroperoxy dicyclic peroxide with a cyclic ketone in a liquid organic carboxylic acid solvent in the presence of a catalytic amount of a strong acid catalyst at low temperatures.

The resulting mixed trimeric peroxide may be converted to a mixed dimeric peroxide by allowing an organic carboxylic acid solution thereof containing a catalytic amount of a strong acid catalyst to stand at about room temperature for a short period of time.

DETAILED DESCRIPTION OF THE INVENTION

More specifically, it has been discovered that mixed tricycloalkylidene peroxides in which at least one of the three of the cyclic ketone precursor molecules are not of the same structure, of the following general formula:

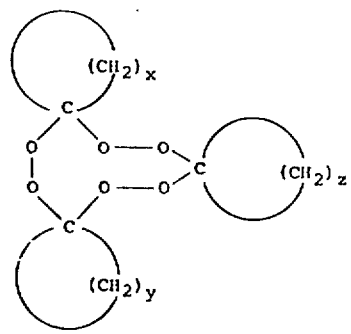

in which $x, y$ and $z$ are positive integers of from 4 to 17 may be prepared in high yields by treating a 1,1'-dihydroperoxydicyclic peroxide of the following general formula:

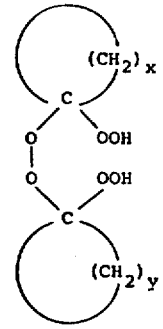

in which $x$ and $y$ are positive intergers of from 4 to 17 with a cyclic ketone of the following general formula:

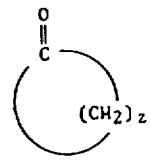

in which $z$ is a positive integer of from 4 to 17 in a liquid organic carboxylic acid wherein the ratio of peroxide to acid solvent is from 50 mmoles of peroxide in 10 ml of acid solvent to 50 mmoles of peroxide in 3,000 ml of acid solvent, with the preferred ratio being 50 mmoles of peroxide to 100 ml of acid solvent, in the presence of a strong mineral or organic acid catalyst; the ratio of peroxide to acid catalyst being from 200 mmoles of peroxide to about 1 ml of concentrated acid to 200 mmoles of peroxide in 100 ml of concentrated acid with the preferred ratio being 200 mmoles of peroxide to 20 ml of catalyst, at temperatures ranging from −30°C to 50°C with the preferred temperature being approximately −20°C. The thus produced mixed trimeric peroxide is obtained as a solid simply by adding water or methanol to the above organic acid reaction solution after a sufficient reaction time of from a few minutes to several hours with the preferred time being 5 hours. The pure trimer is then obtained by washing the solid with water.

Suitable liquid organic carboxylic acid solvents include the liquid, lower aliphatic, preferably lower alkanoic acids such as acetic, formic, propionic and butyric acids.

A wide variety of strong acid catalysts may be employed, such as perchloric, para toluene sulfonic, hydrochloric, sulfuric and nitric acids.

While the above structural formulae do not include substituted peroxides, the method of the invention is also applicable to the preparation of various substituted mixed tricycloalkylidene peroxides. They may be substituted with the following groups: lower alkyl, hydroxy, lower alkoxy, carboxy, hydrocyloweralkyl, carboxyaryl, carboxyloweralkyl, etc. These peroxides produced by the method of the present invention are useful for the synthesis of macrocyclic compounds as described in U.S. Pat. No. 3,528,898. Obviously, the production of these types of macrocyclic compounds would be impossible utilizing symmetrically substituted peroxides.

It is a further feature of the present invention that the mixed tricyclic peroxides of the present invention may be converted into mixed dicyclic peroxides which are new compositions of matter. The tricyclic peroxides are converted into excellent yields of the corresponding dicyclic peroxides by allowing a solution of the tricyclic peroxide in acetic acid or in propionic acid or a mixture of the two acids, and a mineral acid such as perchloric acid to stand at a temperature of from about 0°C to about 50°C, preferably about room temperature for short periods of time of from a few minutes to 24 hours. Alternatively, the trimeric peroxides may be converted into the dimeric peroxide by heating the reaction mixture in which they are produced to the above temperature. Generally, the same reactant, carboxylic acid solvent and catalyst proportions set forth above for production of the mixed trimeric peroxides may also be employed in preparing the dimeric peroxides. These mixed dicycloalkylidene peroxides decompose to give mixtures of macrocyclic compounds which are most useful in the perfume industry as odorants, for example, cyclononanes and cycloundecanes. Substituted dicyclic peroxides containing the abovementioned substituents may also be prepared according to the method of the invention.

The preparation of these mixed dicycloalkylidene peroxides is illustrated as follows:

in which $x$ is a positive integer of from 4 to 17 and $y$ is a positive interger of from 4 to 17. Not only does this process yield mixed dicycloalkylidene peroxides but also non-mixed dicycloalkylidene peroxides.

As will be apparent to those skilled in the art, mixed or non-symmetrical trimeric peroxides may be produced according to the method of the present invention wherein each cyclic constituent in the resulting peroxide is different. Such peroxides may be produced by reacting a mixed or non-symmetrical peroxide, produced according to the process described above, with a cyclic ketone differing from either of the cyclic groups in the dimeric peroxide.

EXAMPLE I

A solution of 5 mmoles of cyclopentanone in 10 ml of propionic acid was placed in a 50 ml Erlenmeyer flask containing a spinbar for magnetic stirring and cooled to just below −20°C by adding dry ice to the solution. To this cooled solution was added with stirring 0.5 ml of a perchloric acid solution, 10% in acetic acid, and 5 mmoles of 1,1'dihydroperoxydicyclopentyl peroxide. The temperature was maintained at about −20°C for one hour after addition was completed. The temperature was then raised to 0°C and kept there for 4 hours. At this time about 35 ml of water was added, resulting in separation of crystals. The separated product was washed with water and dried giving 1.09 grams of tricyclopentylidene peroxide, a 73% yield. The peroxide product was identified by infrared comparison, elemental analysis and by the nature of the products obtained on thermal decomposition of the peroxide, producing a macrocyclic compound.

EXAMPLE II

A solution of 5 mmoles cyclohexanone and 10 ml of propionic acid was placed in a 50 ml Erlenmeyer flask containing a spinbar for magnetic stirring and cooled to just below −20° C by adding dry ice to the solution. To the cooled solution was added with stirring 0.5 ml of a perchloric acid solution, 10% in acetic acid, and 5 mmoles of 1,1'dihydroperoxydicyclopentyl peroxide. The temperature was maintained at about −20° C for 1 hour after addition was complete. The temperature was then raised to 0° C and kept there for 4 hours. After this time, 35 ml of water was added, resulting in a separation of crystals. The crystals were washed and dried, giving a yield of 0.99 grams of dicyclopentylidene cyclohexylidene peroxide, a yield of 63%.

EXAMPLE III

A solution of 5 mmoles of cycloheptanone in 10 ml of propionic acid was placed in a 50 ml Erlenmeyer flask containing a spinbar for magnetic stirring and

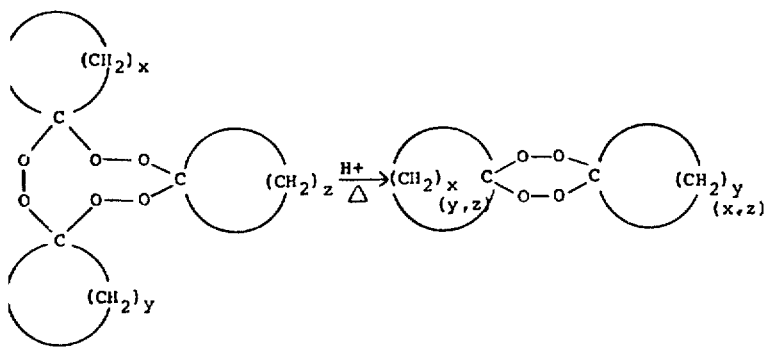

cooled to just below −20° C by adding dry ice to the solution. To the cooled solution was added with stirring 0.5 ml of a perchloric acid solution, 10% in acetic acid, and 5 mmoles of 1,1'dihydroperoxydicyclopentyl peroxide. The temperature was maintained at −20°C for one hour after addition was complete. The temperature was then raised to 0° C and kept there for 4 hours. After this time, about 35 ml of water was added which resulted in separation of crystals. The crystals were washed with water and dried. The resulting product was dicyclopentylidenecycloheptylidene peroxide the amount of 0.61 grams, yield of 37%. The product was identified as in Example I.

EXAMPLE IV

A solution of 5 mmoles of cyclopentanone in 10 ml of propionic acid was placed in a 50 ml Erlenmeyer flask containing a spinbar for magnetic stirring and cooled to just below −20° C by adding dry ice to the solution. To the cooled solution was added with stirring 0.5 ml of a perchloric acid solution, 10% in acetic acid, and 5 mmoles of 1,1' dihydroperoxydicyclohexyl peroxide. The temperature was maintained at about −20° C for one hour after addition was complete. The temperature was then raised to 0° C and kept there for 4 hours. After this time, 35 ml of water was added resulting in a separation of crystals. The crystals were washed and dried. The produce was dicyclohexylidenecyclopentylidene peroxide in the amount of 1.02 grams, a yield of 62%. The product was identified as in Example I.

EXAMPLE V

A solution of 5 mmoles of cyclohexanone and 10 ml of propionic acid was placed in a 50 ml Erlenmeyer flask containing a spinbar for magnetic stirring and cooled to just below −20° C by adding dry ice to the solution. To the cooled solution was added with stirring 0.5 ml of a perchloric acid solution, 10% in acetic acid, and 5 mmoles of 1,1' dihydroperoxydicyclohexyl peroxide. The temperature was maintained at about −20° C for 1 hour after addition was complete. The temperature was then raised to 0° C and kept there for 4 hours. After this time, 35 ml of water was added resulting in crystal separation. The crystals were washed and dried. The product thus produced was tricyclohexylidene peroxide in the amount of 1.30 grams, a yield of 76%. The product was identified as in Example I.

EXAMPLE VI

A solution of 5 mmoles of cyclopentanone in 10 ml of propionic acid was placed in a 50 ml Erlenmeyer flask containing a spinbar for magnetic stirring and cooled to just below −20° C by adding dry ice to the solution. To the cooled solution was added with stirring 0.5 ml of a perchloric acid solution, 10% in acetic acid, and 5 mmoles of 1,1'-dihydroperoxydicycloheptyl peroxide. The temperature was maintained at about −20°C for one hour after addition was complete. The temperature was then raised to 0° C and kept there for 4 hours. After this time, 35 ml of water was added resulting in crystal separation. The crystals were washed with water and dried. The product was dicycloheptylidenecyclopentylidene peroxide, 1.17 grams, a yield of 66%. The product was identified as in Example I.

EXAMPLE VII

A solution of 50 mmoles of 4-methoxycyclohexanone and 20 ml of propionic was cooled down to −20° C by adding powdered dry ice. The solution was stirred and to it was added 0.2 ml of 10% perchloric acid in acetic acid and 5 mmoles of 1,1'-dihydroperoxydicyclododecyl peroxide. The temperature of the solution was maintained at −20° C for 1½ hours and then raised to 0° C and maintained at this temperature for 2½ hours. Water was added to the reaction mixture which yielded 2 grams of a colorless mass. After filtering, the mass turned pasty and it was stirred in methanol for 4 hours at 0° C which yielded a colorless crystalline product, dicyclododecylidene-4-methoxycyclohexylidene peroxide, identified by infrared analysis.

EXAMPLE VIII

A solution of 5 mmoles of 4-methoxycyclohexanone in 20 ml of propionic acid was placed in a 100 ml Erlenmeyer flask containing a spinbar for magnetic stirring and cooled to just below −20° C by adding powdered dry ice to the solution. To this solution was added 0.5 ml of 10% perchloric acid in acetic acid and 10 mmoles of 1,1'-dihydroperoxydicyclopentyl peroxide. The temperature was maintained at about −20°C for 2 hours after addition was completed. The temperature was then raised to about 0°C and after 2 more hours, 100 ml of water was added to the reaction mixture, resulting in a heavy oil. This oil became a pasty mass by stirring with a large amount of water for several hours at 0°C. The water was decanted and the reaction product dried. This product was dicyclopentylidene-4-methoxycyclohexylidene peroxide as identified by infrared analysis.

A 500 mg sample of the dicyclopentylidene-4-methoxycyclohexylidene peroxide was thermolyzed by refluxing in 10 ml decane for 2 hours. Gas chromatographical analysis of the reaction mixture which was identified by infrared analysis disclosed the decomposition products to be methoxycyclotridecane; 20% yield; methoxycyclotetradecanolide, approximately 20% yield; and the methoxy derivative of a cyclic dilactone containing 15 C. atoms.

The following examples are directed to the synthesis of mixed dicycloalkylidene peroxides from mixed tricycloalkylidene peroxides.

EXAMPLE IX

A solution of 5 mmoles of cyclohexanone in 10 ml of propionic acid was placed in a 50 ml Erlenmeyer flask containing a spinbar for magnetic stirring and cooled to just below −20°C by adding dry ice to the solution. To the cooled solution was added with stirring 0.5 ml of a perchloric acid solution, 10% in acetic acid, and 5 mmoles of 1,1' dihydroperoxydicyclopentyl peroxide. The temperature was maintained at about −20° C for 1 hour after addition was complete. At this point, the trimeric mixed peroxide, dicyclopentylidenecyclohexylidene peroxide was produced.

After maintaining the solution for one hour at −20° C, the temperature was raised to 0° C and kept there for 4 hours. Thereupon, 25 ml of acetic acid and 1 ml of the perchloric acid solution, all at room temperature, were added to the reaction mixture with stirring. After 1 hour at room temperature, the mixture was diluted with about 100 ml of water. The crystalline solid which separated was filtered and washed with water and then recrystallized with acetone-water. A mixed dicycloperoxide was produced, cyclopentylidenecyclohexylidene peroxide and a non-mixed peroxide, dicyclohexylidene. The melting point of the mixed dicycloalkylidene peroxide was 78° – 105° and weighed 0.29 grams which gave a yield of 27%. These products were established by their photolysis in methylene chloride solvent which gave the corresponding macrocyclic hydrocarbon whose structures were determined by infrared analysis and mass spectral analysis.

EXAMPLE X

A solution of 5 mmoles of cycloheptanone in 10 ml of propionic acid was placed in a 50 ml Erlenmeyer flask containing a spinbar for magnetic stirring and cooled to just below −20° C by adding dry ice to the solution. To the cooled solution was added with stirring 0.5 ml of a perchloric acid solution, 10% in acetic acid, and 5 mmoles of 1,1′ dihydroperoxydicyclopentyl peroxide. The temperature was maintained at about −20° C for 1 hour after the addition was complete. At this point, a mixed peroxide was present, dicyclopentylidenecycloheptylidene.

Thereupon, 25 ml of acetic acid and 1 ml of the perchloric acid solution, all at room temperature, was added to the reaction mixture with stirring. After 1 hour at room temperature, the mixture was diluted with about 100 ml of water. The crystalline solid which separated was filtered and washed with water and then recrystallized with acetone-water. The products thus produced were cyclopentylidenecycloheptylidene peroxide, a mixed dicycloalkylidene peroxide, melting point 49° – 55° C. in the amount of 0.29 grams representing a yield of 27%, and dicycloheptylidene peroxide. These compounds were identified as in Example IX.

EXAMPLE XI

A solution of 5 mmoles of cyclopentanone in 10 ml of propionic acid was placed in a 50 ml Erlenmeyer flask containing a spinbar for magnetic stirring and cooled to just below −20° C by adding dry ice to the solution. To the cooled solution was added by stirring 0.5 ml of a perchloric acid solution, 10% in acetic acid, and 5 mmoles of 1,1′-dihydroperoxydicyclohexyl peroxide. The termperature was maintained at about −20° C for 1 hour after addition was complete.

A mixed tricycloalkylidene peroxide was produced, dicyclohexylidenecyclopentylidene. Thereupon, 25 ml of acetic acid and 1 ml of the perchloric acid solution, all at room temperature, was added to the reaction mixture with stirring. After 1 hour at room temperature, the mixture was diluted with about 100 ml of water. The crystalline solid which separated, was filtered and washed with water and recrystalized with acetone-water. The products produced were cyclopentylidenecyclohexylidene peroxide, a mixed dicycloalkylidene peroxide with a melting point of between 90° – 110° C, 0.66 grams representing a yield of 62%, and dicyclohexylidene. The products were identified as in Example IX.

EXAMPLE XII

A solution of 5 mmoles of cycloheptanone in 10 ml of propionic acid was placed in a 50 ml Erlenmeyer flask containing a spinbar for magnetic stirring and cooled to just below −20° C by adding dry ice to the solution. To the cooled solution was added with stirring 0.5 ml of a perchloric acid solution, 10% in acetic acid, and 5 mmoles of 1,1′-dihydroperoxydicyclohexyl peroxide. The temperature was maintained at about −20° C for 1 hour after addition was complete.

After this time, the temperature was raised to 0° C and kept there for 4 hours. Thereupon 5 ml of acetic acid and 1 ml of the perchloric acid solution, all at room temperature was added to the reaction mixture with stirring. After 1 hour at room temperature with stirring, the mixture was diluted with about 100 ml of water. The crystalline solid which separated was filtered and washed with water and then recrystallized with acetone-water. The products produced in this reaction were cyclohexylidenecycloheptylidene peroxide, a mixed dicycloalkylidene peroxide with a melting point of between 90° – 105° C, 0.90 grams, a yield of 84%, dicyclohexylidene peroxide and dicycloheptylidene peroxide. These products were identified as in Example IX.

EXAMPLE XIII

The exact procedure of Example IX was followed except cyclopentanone was used and the peroxide 1,1′ dihydroperoxydicycloheptyl was used. This gave reaction products of cyclopentylidenecycloheptylidene peroxide, a mixed dicycloalkylidene peroxide with a melting point of between 60° – 90° C, 0.53 grams representing a yield of 50%, and dicycloheptylidene peroxide.

EXAMPLE XIV

The exact procedure of Example IX was used except 1,1′dihydroperoxydicycloheptyl peroxide was used. The reaction products were cyclohexylidenecycloheptylidene peroxide, a mixed dicycloalkylidene peroxide with a melting point of between 82° – 84° C, 0.79 grams, a yield of 74%, dicyclohexylidene peroxide and dicycloheptylidene peroxide.

EXAMPLE XV

The exact procedure of Example IX was followed except cyclooctanone ketone was used, and 1,1′dihydroperoxydicycloheptyl peroxide was used. The reaction products were cycloheptylidenecyclooctylidene peroxide, a mixed dicycloalkylidene peroxide with a melting point of between 82° – 91° C, 0.53 grams representing a yield of 50%, and dicycloheptylidene peroxide.

EXAMPLE XVI

The exact procedure of Example IX was used except 1,1′dihydroperoxydicyclohexyl peroxide was used. The reaction products were dicyclohexylidene peroxide which had a melting point of between 125° – 129° C, 1.03 grams representing a 97% yield.

EXAMPLE XVI

The exact procedure of Example IX was used except cyclopentanone ketone was used. The reaction products were dicyclopentylidene peroxide with a melting point of between 94°–104° C, 0.055 grams representing a yield of 5%.

EXAMPLE XVIII

A solution of 5 mmoles of cyclododecanone in 10 ml of propionic acid was placed in a 50 ml Erlenmeyer flask containing a spinbar for magnetic stirring and cooled to approximately −20° C by adding dry ice to the solution. To the cooled solution was added with stirring 0.5 ml of 10% perchloric acid in acetic acid and 5 mmoles of 1,1'dihydroperoxydicycloheptyl peroxide. The temperature was raised to 0° C and kept there for four hours. Thereupon 35 ml of water was added resulting in the formation of a viscus liquid—the bottom layer of the two layer system. This was recrystallized from methanol yielding colorless crystals 0.86 grams of dicycloheptylidenecyclododecylidene peroxide, melting point of 83° – 139° C. This resulting product was identified by infrared analysis which results were consistant with the structure of the produced peroxide. Further structural proof was made by thermalizing 500 mg of the above produced product by refluxing in 10 ml of decane for two hours. Gas chromatographic analysis of the reaction mixture disclosed the decomposition products to be cyclotrieicosane, cyclotetraeicosanolide and cyclopentaeicosanodilide.

EXAMPLE XIX

A solution of 30.4 mmoles, 3.78 grams, of freshly distilled cyclooctanone and 30 ml of acetonitrile was prepared. To this solution 2 ml of 98% hydrogen peroxide was added and the mixture was stirred for 5 minutes at 0°C, and then 5 drops of 70% perchloric acid were added. After 24 hours stirring at 0°C, there was obtained a very viscous liquid which was treated with 30 ml of methanol. The reaction solution was allowed to stand for 24 hours at 0°C, yielding 870 mg of tricyclooctylidene peroxide, 20% yield of colorless crystals, m.p. 72°C –75°C.

A solution of 400 mg of tricyclooctylidene peroxide was refluxed in 10 ml of decane for 3 hours. A gas chromatograph analysis showed three peaks whose retention times matched with the expected thermal decomposition products of the above trimer.

EXAMPLE XX

A solution of 5 mmoles of cyclohexane-1,4-dione in 30 ml of propionic acid was placed in a 100 ml Erlenmeyer flask containing a spinbar for magnetic stirring and cooled to just below −20°C by adding powdered dry ice to the solution. To the cooled solution was added with stirring 0.5 ml of a perchloric acid solution, 10% in acetic acid, and 20 mmoles of 1,1'dihydroperoxydicyclohexyl peroxide. The temperature was maintained at −20°C for 3 hours and then raised to 0°C and maintained for 17 hours. Thereupon, 100 ml of water was added which resulted in the formation of a viscous liquid as the bottom layer. The bottom layer was separated and washed with water and then dissolved in about 20 ml of methanol. The solution was kept for 7 days at 0°C, after this time crystals separated;

they were filtered, washed with methanol, recrystallized from acetone to give a yield of 0.48 grams, 13 per cent yield, m.p. 160°C. The product, tetracyclohexylidene-1,4-cyclohexylidene, was checked by elemental analysis, molecular weight determination in benzene and by infrared spectrum.

Thus, with the process of the present invention one is able to produce mixed tricycloalkylidene peroxides in high yields as well as the mixed dicycloalkylidene peroxides in high yields within a short reaction time employing solid ketones. Also, it was not necessary to employ an excess of the ketones. The procedure itself is straight-forward and not complicated. Further, the process of this invention has produced novel dimeric peroxides.

What is claimed is:

1. A method for preparing mixed dimeric peroxides of the formula:

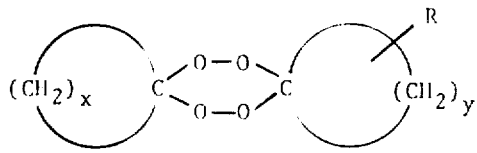

wherein:
$x$ and $y$ are different and are integers from 4 to 17,
R is hydrogen or methoxy, which comprises allowing a solution of a trimeric peroxide having the formula:

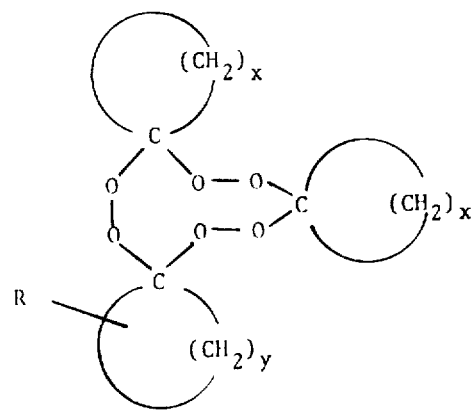

wherein $x$, $y$ and R have the above meanings in a liquid lower alkanoic acid solvent containing a catalytic amount of a strong acid to stand at a temperature of from about 0°C. to about 50°C.

* * * * *